United States Patent [19]
Sudarsky et al.

[11] Patent Number: 6,088,035
[45] Date of Patent: Jul. 11, 2000

[54] METHOD FOR DISPLAYING A GRAPHIC MODEL

[75] Inventors: Oded Sudarsky, Afula; Graig J. Gotsman, Haifa, both of Israel

[73] Assignee: Virtue, Ltd., Tirat Carmel, Israel

[21] Appl. No.: 09/000,462

[22] PCT Filed: Aug. 12, 1997

[86] PCT No.: PCT/IL97/00273

§ 371 Date: Feb. 23, 1998

§ 102(e) Date: Feb. 23, 1998

[87] PCT Pub. No.: WO98/08194

PCT Pub. Date: Feb. 26, 1998

[30] Foreign Application Priority Data

Aug. 16, 1996 [IL] Israel .................................. 119082

[51] Int. Cl.[7] .......................... G06T 15/40; G06T 15/70
[52] U.S. Cl. .................. 345/421; 345/422; 345/419
[58] Field of Search .................................. 345/420, 421, 345/422, 356, 475

[56] References Cited

U.S. PATENT DOCUMENTS

| | | | |
|---|---|---|---|
| 5,263,130 | 11/1993 | Pomerantz et al. . | |
| 5,317,689 | 5/1994 | Nack et al. ............................... | 345/505 |
| 5,386,500 | 1/1995 | Pomerantz et al. . | |
| 5,572,634 | 11/1996 | Duluk, Jr. . | |
| 5,579,455 | 11/1996 | Green et al. ............................ | 345/421 |
| 5,613,049 | 3/1997 | Brechner et al. . | |
| 5,729,471 | 3/1998 | Jain et al. ............................... | 345/419 |
| 5,914,721 | 6/1999 | Lim ........................................ | 345/421 |

OTHER PUBLICATIONS

Heckbert P. et al., "Multiresolution Modeling for Fast Rendering" in Proceedings of Graphics Interface '94 (Banff, Alberta), (May 1994).

Funkhouser T., "RING: A Client–Server System for Multi-User Virtual Environments" in Proceedings of the 1995 Symposium on Interactive 3D Graphics, (Monterey, California), pp. 85–92. ACM SIGGRAPH, (April 1995).

Greene N. et al. "Hierarchical Z–buffer Visibility" in SIGGRAPH '93 Conference Proceedings, (Anaheim, California) pp. 231–238, (August 1993), ACM Computer Graphics, 27(4).

Naylor B. "Partitioning Tree Image Representation and Generation from 3D Geometric Models" in Proceedings of Graphics Interface '92, (Vancouver), pp. 201–212, (May 1992).

Greene N. et al., "Error–Bounded Antialiased Rendering of Complex Environments" in SIGGRAPH '94 Conference Proceedings, (Orlando, Florida), pp.59–66, (July 1994), ACM Computer Graphics, 28(4).

(List continued on next page.)

Primary Examiner—Mark K. Zimmerman
Assistant Examiner—Van Cao
Attorney, Agent, or Firm—Oliff & Berridge, PLC

[57] ABSTRACT

In a process for rendering a 3-dimensional graphics scene made up of a plurality of static and/or dynamic objects composed of geometrical elements, a method for obviating redundant processing and communications involved with hidden dynamic objects, so as to accelerate the rendering of successive images of the scene and to reduce communications requirements (FIG. 6C). The method includes in respect of each occluded dynamic object: (a) predicting a time period during which the object is expected to remain occluded; (b) generating a volume that contains the object during the time period; (c) inserting the volume into a spatial data structure used by an occlusion culling technique; (d) applying the occlusion culling technique so as to output-sensitively render the scene, yet not rendering or updating the occluded dynamic object during the time period, provided the occlusion culling technique does not find the volume to be visible.

27 Claims, 12 Drawing Sheets

OTHER PUBLICATIONS

Sudarsky O. et al., "Output–sensitive Visibility Algorithms for Dynamic Scenes with Applications to virtual Reality" in Computer Graphics, Forum, Sept. 1996 (Proceedings of Eurographics '96: Aug. 26, 1996).

Earnshaw Prof R. A. et al., "Visualization and Virtual Reality on the Internet" in Proceedings of the Visualization Conference, (Jerusalem, Israel), (Nov. 1995).

Naylor B., "Merging BSP Trees Yields Polyhedral Set Operations" in SIGGRAPH '90 Conference Proceedings, (Dallas, Texas), pp. 115–124, (Aug. 1990) ACM Computer Graphics, 24(4).

METHOD FOR DISPLAYING A GRAPHIC MODEL

FIELD OF THE INVENTION

This invention relates to a method for displaying successive frames of a graphics model on a computer screen.

BACKGROUND OF THE INVENTION

The animation picture industry was founded on the realization that animation or apparent movement could be achieved by successively presenting to the human eye still images at high frequency, each representing a small, incremental movement with respect to its predecessor. Providing the frequency at which the still images are presented to the human eye exceeds the so-called "frequency of fusion", the eye is unable to detect that it is, in reality, seeing only discrete images and the eye-brain combination labors under the illusion that it is seeing a continuous, moving picture.

Modern graphics systems which exploit this fact abound and what all such systems have in common is the capture of successive frames of digital information which are then displayed on a suitable display screen at sufficiently high frequency. When it is desired to display such images at high resolution, then, of course, the display monitor itself must possess a large number of pixels and this in turn demands that each displayed frame of digital image data requires a large volume of data. In practice, this means not only that large memories are required for storing the digital image data but, more importantly, that very fast processing is required in order to be able to process each frame of image data presented to the display monitor at a rate no less than the frequency of fusion, i.e. about 30 Hz.

A graphics model is generally constructed from static objects representing a fixed background scene and one or more dynamic objects which move within the fixed background scene. In practice, a moving picture is derived by generating a large number of frames of pixel data each representing slight incremental movements between one frame and its successor. The visible pixels in each frame represent the instantaneous view of an object as seen by an observer. This instantaneous view is subject to change between successive frames owing to the movement of the dynamic objects within the static scene and changing perspective of the viewer.

Visibility calculation is one of the most important tasks in computer graphics. Given a geometric model of a scene and a viewpoint, the goal of visibility calculation (also known as hidden surface removal) is to find which parts of the model are visible from the viewpoint. The performance of the visibility calculation stage can largely affect that of the entire rendering process because if an element of the geometric model is found to be invisible then various other time-consuming calculations (such as shading, for example) do not have to be performed for this element.

It should be noted, however, that whilst visibility calculation is normally a precursor to displaying graphic images, the display of such images is independent of the visibility calculation and not always performed. Moreover, the enhanced display of graphic images may not be the only consideration which leads to the desire to speed up visibility calculation of graphic images. For example, a graphic model may be stored in a computer which is remote from a user and dynamic changes to the graphic model may be performed by an operator located at the remote computer. Such changes must be reflected in the model stored locally at the user's site by sending update information to the user's computer so that his version of the graphic model can be modified. In such case, it is desirable to minimize as far as possible the volume of update data which needs to be communicated to the user's computer, since the communication channel (typically a network) is usually the major bottleneck in computer systems responsible for degradation of system performance. It may also be the case that the updated graphic model at the user's site is not itself displayed but forms the basis for further computation and processing, for example, as part of a simulation machine. In other words, in all cases the speed of rendering graphic images is paramount: the display of the graphic image may be optional.

In the following discussion of prior art approaches to improving the speed of visibility algorithms, reference will be made to the following publications:

1. P. S. Heckbert and M. Garland, "*Multiresolution modeling for fast rendering*", in Proceedings of Graphics Interface '94 (Banff, Alberta), (May 1994).
2. T. A. Funkhouser, "*RING: A client-server system for multi-server environments*", in Proceedings of the 1995 Symposium on Interactive 3D Graphics, (Monterey, Calif.), pp. 85–92, ACM SIGGRAPH, (April 1995).
3. N. Greene, M. Kass and G. Miller "*Hierarchical Z-buffer visibility*", in SIGGRAPH '93 Conference Proceedings, (Anaheim, Calif.) pp. 231–238, (August 1993). ACM Computer Graphics, 27(4).
4. B. F. Naylor, "*Partitioning tree image representation and generation from 3D geometric models*", in Proceedings of Graphics Interface '92, (Vancouver), pp. 201–212, (May 1992).
5. N. Greene and M. Kass, "*Error-bounded antialiased rendering of complex environments*", in SIGGRAPH '94 Conference Proccedings, (Orlando, Fla.), pp. 59–66, (July 1994). *ACM Computer Graphics*, 28(4).
6. O. Sudarsky and C. Gotsman, "*Output-sensitive visibility algorithms for dynamic scenes with applications to virtual reality*", in Computer Graphics Forum, September 1996 (Proceedings of Eurographics '96: Aug. 26, 1996).
7. R. A. Earnshaw, N. Chilton and I. J. Palmer, "*Visualization and virtual reality on the Internet*", in Proceedings of the Visualization Conference, (Jerusalem, Israel), (November 1992).
8. B. F. Naylor, J. Amanatides and W. C. Thibault, "*Merging BSP trees yields polyhedral set operations*", in SIGGRAPH '90 Conference Proceedings, (Dallas, Tex.), pp. 115–124, (August 1990). *ACM Computer Graphics*, 24(4).

The visibility calculation's runtime can become a problem with big, complex models featuring large numbers of graphic primitives. Consider, for example, a detailed model of a big building. Although, it might include millions of polygons, only a small fraction of them will be visible from any single viewpoint. In such scenes, it would be preferable if the visibility calculation algorithm's runtime were linearly proportional just to the number of visible primitives, rather than the total number of primitives in the model.

A visibility algorithm is called output-sensitive if its runtime per frame (excluding any initialization) is linearly proportional to n+f(N) where N is the number of primitives in the entire model, n is the number of visible primitives and f(N) is significantly smaller than N. f(N) is the (inevitable) overhead imposed by the algorithm. An output-sensitive visibility calculation algorithm is also called occlusion culling or visibility culling algorithm. However, most visibility algorithms are not output-sensitive. For example, the well-known Z-buffer visibility algorithm is not output-sensitive, because it examines each polygon in the model. Even if every polygon is handled very quickly (e.g. in hardware), the runtime is still proportional to the total number of polygons.

In a recent survey on real-time 3D rendering[1], Heckbert and Garland claimed that output-sensitive visibility algorithms are essential in future generation graphics systems. Since the Z-buffer visibility algorithm is the most well-known and popular visibility algorithm but suffers from the drawback that it is not output-sensitive, much recent research has been expended to extending the Z-buffer visibility algorithm so as to make it output-sensitive.

Such research on output-sensitive visibility calculation has only begun recently, and has yet to reach commercial systems. For example, both SGI's IRIS Performer high-performance graphics package and IBM's 3DIX architectural and mechanical model visualizer incorporate view frustum culling and multiple-resolution representations (level-of-detail switching) to speed up rendering, but neither employs visibility culling.

If significant parts of the model are dynamic, then its complexity becomes even more of a problem. The known output-sensitive visibility algorithms become ineffective in such cases. Furthermore, in addition to the time it takes to render the model's visible parts, considerable time is spent just keeping it up-to-date. An example of a large model with numerous dynamic objects is an environment which multiple users roam simultaneously, such as Funkhouser's RING system[2] and Worlds Inc.'s AlphaWorld. With existing visibility algorithms, the model in each user's workstation must reflect the other users' current whereabouts. In a distributed environment, it might take much time to update this model, and even more time to transmit the other users' movements over communication lines.

The use of hierarchical data structures to subdivide object space would appear to be an intrinsic property of all output-sensitive visibility algorithms: a hierarchical spatial data structure is needed to quickly cull large, occluded regions of space, without explicitly considering every object within those regions. Such an approach is employed in Greene et al's hierarchical Z-buffer algorithm[3] and in Naylor's BSP tree projection method[4]. However, the spatial data structure does not have to be a hierarchy in the strict sense of the word. For example, it may be a Directed Acyclic Graph, and sibling nodes do not have to represent disjoint regions of space.

The hierarchical Z-buffer algorithm is based on the ordinary Z-buffer, but uses two hierarchical data structures: an octree and a Z-pyramid. The lowest level of the pyramid is a plain Z-buffer; in all other levels, there is a pixel for every 2×2 square of pixels in the next lower level, with a value equal to the greatest (farthest) z among these four pixels.

At the algorithm's initialization stage, an octree is constructed for the entire model. This operation is very time-consuming, and takes much longer than just calculating visibility from a single viewpoint; however, assuming the model is static, the same octree can be used to calculate visibility from many different viewpoints.

To calculate visibility from a viewpoint, the Z-pyramid is first initialized to infinity at all pixels in all levels. Then, recursively from the octree's root, each encountered octree node is checked for occlusion by the current contents of the Z-pyramid. If a node is totally hidden, it can be ignored; otherwise, the primitives directly associated with the node are rendered, the Z-pyramid is updated accordingly, and the eight child nodes are traversed recursively, from near to far. Because of this front-to-back order, there is a good chance that farther nodes will be discovered to be occluded by primitives in nearer ones, thus saving the handling of all the subtrees associated with the farther nodes.

The pyramid is used for fast visibility checking of nodes and primitives: find the lowest pyramid level where a single pixel still covers the entire projection of the primitive or node. If the z value registered at that pixel is closer than the closest z the projection, then the entire primitive or node is invisible. Otherwise, the projection is divided into four, and checked against each of the four corresponding pixels in the next lower level.

A more recent version of the hierarchical Z-buffer algorithm proposed by Greene and Kass[5] uses an image-space quadtree instead of a Z-pyramid. This worsens performance to some extent, but enables effective antialiasing.

Naylor's projection algorithm performs output-sensitive visibility calculation using the same principle as the hierarchical Z-buffer algorithm: elimination of large parts of the model at an early stage of the calculation, using a data structure constructed at preprocessing time. However, Naylor uses more sophisticated data structures: BSP (binary space partitioning) trees.

A BSP tree[4] can be defined in any number of dimensions. It is a binary tree, in which each node represents some hyperplane; the left subtree of the node corresponds to the negative half-space of the hyperplane, while the right subtree corresponds to the positive half-space. For example, FIG. 1a shows the 2D case, wherein each node represents a line, and each subtree represents a region in the plane. FIG. 1b shows the hierarchical relationship of the nodes and corresponding regions in the hyperplane starting from the root node A. Each region is denoted numerically to distinguish from the nodes themselves which are denoted alphabetically. There may also be stored additional data characterizing each region, such as color data.

In the 3D case, a BSP tree is a proper generalization of an octree: the planes dividing each node do not have to be in the middle of the node, and are not necessarily axis-parallel. In fact, if the model consists entirely of planar, polygonal faces, then the BSP tree is general enough to represent the scene itself accurately, without need for any additional data structure; a boolean "in/out" attribute is simply maintained with each leaf node. This is in contrast to an octree, which usually serves only as an auxiliary data structure in computer graphics, and not as a representation of the model itself.

Naylor[4] suggests using 2D BSP trees to represent images, and scan-converting them into raster images only as a last stage, for actual display. He presents an algorithm to project a 3D BSP tree, representing a scene model, into a 2D BSP tree representing its image. This algorithm traverses the input BSP tree recursively, from near to far, discarding all regions of space occluded by model faces. Output sensitivity is achieved for the same reason it is attained in the hierarchical Z-buffer algorithm: wholesale elimination of large, hidden parts of space, without specifically examining each object in these parts. Contrary to the hierarchical Z-buffer algorithm, Naylor's projection algorithm needs no further data structures beyond those representing the model and the image. Again, the construction of the hierarchical spatial data structure (in this case, the 3D BSP tree) is very time-consuming; but it is only constructed once, as a pre-processing stage, and subsequently used for visibility calculation from many different viewpoints.

Both output-sensitive visibility algorithms—hierarchical Z-buffer and BSP tree projection—were originally developed for static scenes. While Greene et al. suggest a certain optimization for animation sequences (yielding about×2 speedup after rather significant overhead), these sequences are restricted to "walk-throughs", where the whole model is static and only the viewpoint may change between frames.

For visibility culling algorithms to produce correct results, an up-to-date spatial data structure of the model has to be used. If any objects in the model move or deform then the underlying data structure may become incorrect, and must be updated. It is not acceptable to construct it again from scratch, because, as mentioned above, this is a very expensive operation—usually more expensive than rendering a single frame by the plain Z-buffer algorithm.

It would therefore be desirable to provide an improved method for displaying graphic models which adapts visibility culling algorithms to dynamic scenes, and also utilizes them to minimize the update overhead to those parts of the model that may be potentially visible to the user.

SUMMARY OF THE INVENTION

It is an object of the invention to provide a method for displaying successive frames or images of a graphics scene on a computer screen in which the above drawbacks are reduced or eliminated.

It is a particular object of the invention to provide an improved visibility algorithm which allows for faster updating of the data structure and thus yields more efficient processing.

According to a broad aspect of the invention there is provided in a process for rendering a 3-dimensional graphics scene comprising a plurality of static and/or dynamic objects composed of geometrical elements, a method for accelerating the rendering of successive images of said scene comprising the steps of:

(a) in an initialization step:
 (i) determining which of the dynamic objects are visible and which are hidden at their initial positions,
 (ii) creating temporal bounding volumes for the hidden dynamic objects consequent to projected motion thereof during a respective time period $\Delta t$ not necessarily identical for all dynamic objects,
 (iii) constructing a spatial data structure containing the static objects, the visible dynamic objects at their initial positions and the hidden dynamic objects' temporal bounding volumes, and
 (iv) maintaining an event queue of the times at which the temporal bounding volumes are no longer assured to contain their respective dynamic objects, (b) inserting the hidden dynamic objects which are no longer assured to be contained within their respective temporal bounding volumes (either because the event queue so reported or because the objects' motion violated some assumption by which the temporal bounding volumes were created) into the spatial data structure instead of the respective temporal bounding volumes, (c) output-sensitively processing the spatial data structure so as to render its visible parts and so as to replace visible temporal bounding volumes by their respective dynamic objects, (d) creating temporal bounding volumes for the hidden dynamic objects which do not already have temporal bounding volumes, inserting said temporal bounding volumes into the spatial database instead of the hidden dynamic objects and inserting into the event queue the times at which the temporal bounding volume will no longer be assured to contain their respective dynamic objects, and (e) repeating steps (b) to (d) for each image to be rendered.

In accordance with a particular implementation of such a method, in the initialization step a potentially visible dynamic object list is created of all potentially visible dynamic objects and step (a) includes the steps of:

(i) initializing the potentially visible dynamic object list to contain all dynamic objects and the event queue to be empty, and
(ii) constructing a spatial data structure containing the static objects; and step (b) comprises the steps of:
(i) inserting the hidden dynamic objects which are no longer assured to be contained within their respective temporal bounding volumes (either because the event queue so reported or because the objects' changes violated some assumption by which the temporal bounding volumes were created) into the potentially visible dynamic object list, and
(ii) obtaining the current position of every object in the potentially visible dynamic object list and inserting it into the spatial data structure.

The remainder of the method is essentially the same except that the potentially visible dynamic object list is constantly updated as previously hidden dynamic objects become visible and as previously visible dynamic objects become hidden.

In order to achieve optimum performance the spatial data structure is preferably hierarchical; although degraded performance, albeit still improved over hitherto-proposed methods, may still be obtained with non-hierarchical spatial data structures, e.g. a fixed grid.

In accordance with a broad aspect of the invention, there is provided in a process for rendering a 3-dimensional graphics scene comprising a plurality of static and/or dynamic objects composed of geometrical elements, a method for obviating redundant processing of hidden dynamic objects in successive images of said scene so as thereby to accelerate the rendering of successive images of said scene; the method including in respect of each hidden dynamic object:

(a) predicting a time period $\Delta t$ during which said hidden dynamic object is assummed to remain hidden; and
(b) during said time period $\Delta t$, not rendering said hidden dynamic object so as to output-sensitively process the scene.

In accordance with specific embodiment "assumed" encompasses also assured. Time period may be expressed in time units or equivalent terms (e.g. number of succesive images).

BRIEF DESCRIPTION OF THE DRAWINGS

In order to understand the invention and see how it may be carried out in practice, some preferred embodiments will now be described, by way of non-limiting example only, with reference to the accompanying drawings, in which.

DETAILED DESCRIPTION OF PREFERRED EMBODIMENTS

The invention is based on the understanding that there exist two ways to update the data structure efficiently: (1) minimize the time required to update the structure for a dynamic object; (2) minimize the number of dynamic objects for which the structure has to be updated. Although the second approach would appear to be of greater commercial importance, for the sake of completeness the first approach will also be described.

Figure 1B:
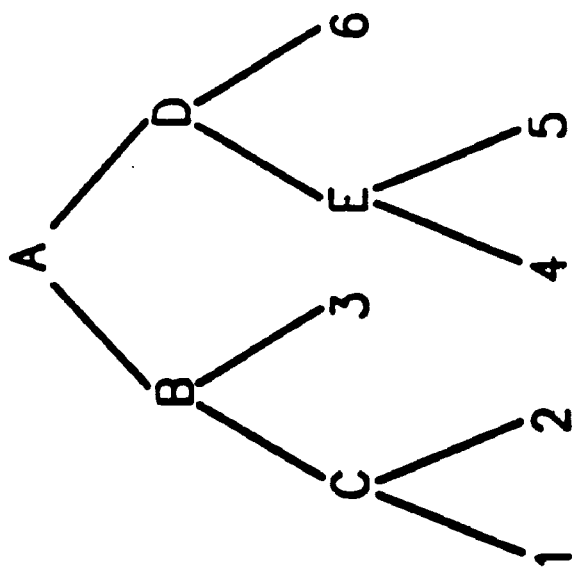
FIGS. 1a and 1b is a schematic representation of a prior art 2D BSP tree.
Figure 1A:
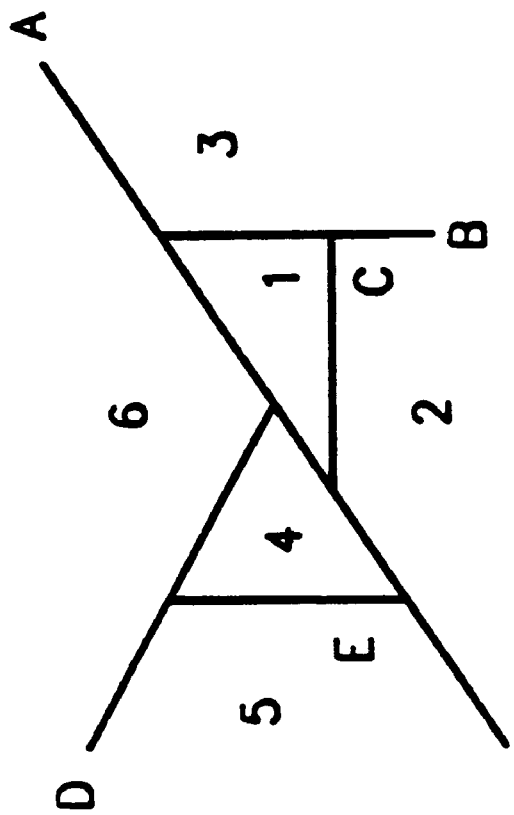
Figure 2A:
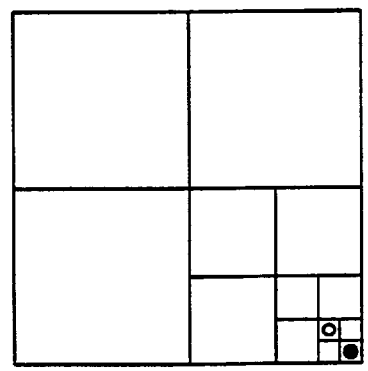
FIGS. 2a, 2b and 2c show pictorially vertical views of an octree during respective stages of a naïve update method.
Figure 2B:
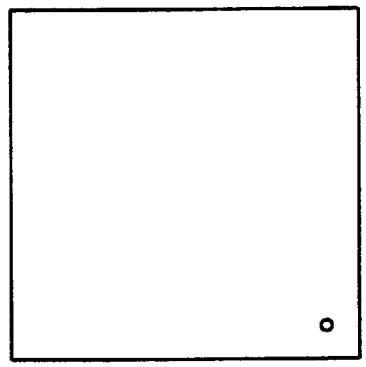
Figure 2C:
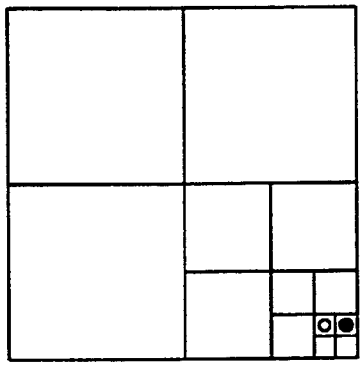

FIGS. 2a, 2b and 2c show pictorially vertical views of an octree during respective stages of a naïve update method wherein the object is deleted from the octree and then inserted back at its new position. Thus, FIG. 2a shows the initial model having a static and dynamic primitive respectively denoted by the white and black circles. Starting from the root of the octree corresponding to the complete outer square, the octree nodes are successively deleted as shown in FIG. 2b so as to delete the dynamic primitive, leaving only the white circle representative of the static primitive. In FIG. 2c, the dynamic primitive is re-inserted at its new location and the octree nodes are re-created. This method, which will be denoted as N, is much better than rebuilding the entire octree, but it is still not optimal: octree nodes are needlessly deleted and created; furthermore, the search for the node in which to insert an object takes place over an unnecessarily long path. The update can be optimized by utilizing the temporal coherence inherent in animation sequences: consecutive images in the sequence are expected to be very similar to each other. An analogous correspondence exists between the model's states at consecutive frame times: dynamic objects usually do not "jump" randomly from place to place around the scene; the position and shape of a dynamic object at a certain frame are expected to be close to its position and shape at the previous frame. Therefore, if a primitive is deleted and inserted as per the naïve method N, it is likely that octree nodes will be needlessly deleted, only to be immediately created again.

It should be noted that the octree's depth is not necessarily dependent on the number of objects in it. By bringing objects closer together it is possible to obtain an arbitrarily deep octree.

Figure 3A:
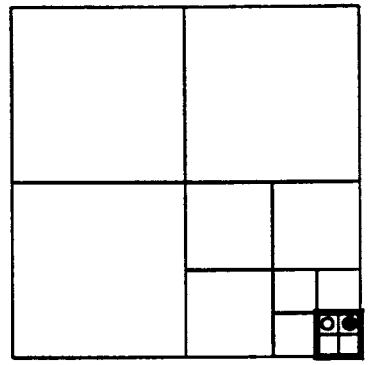
FIGS. 3a, 3b and 3c show pictorially vertical views of an octree during respective stages of a basic update method.
Figure 3B:
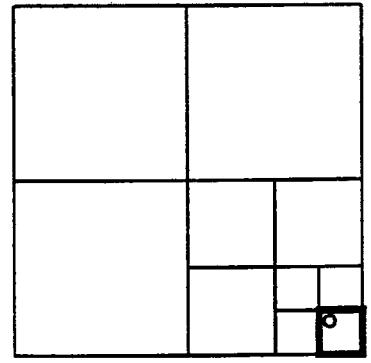
Figure 3C:
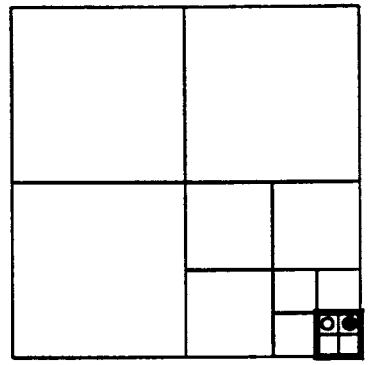

FIGS. 3a, 3b and 3c show pictorially vertical views of an octree during respective stages of an improved update method B wherein the octree is updated more efficiently by utilizing the fact that the change in the tree is restricted to the minimal subtree containing the dynamic primitive at both its old and new locations. The node at the root of this subtree as shown in FIG. 3a is denoted as v=LCA(primitive, new_config), as it is the Least Common Ancestor of all the nodes which contain the primitive's old and new configurations. The octree update method now becomes: find v, delete the dynamic primitive (still at its old position) from the sub-octree under v as shown in FIG. 3b, and insert it at its new location into the same sub-octree as shown in FIG. 3c. It can be proven[6] that method B is correct, i.e. it delivers the same results as the naïve method N. It can likewise be shown[6] that method B is optimal, in the sense that it does not needlessly delete or create any nodes in the octree (with the possible exception of empty leaf nodes).

If the octree is relatively deep, representing a big, complex model, then v is expected to be closer to the leaves than to the root. This is because of temporal coherence—each dynamic object's location is expected to be close to its place at the previous frame; and because the planes separating high (large) octree nodes are few and far between compared to the planes separating smaller nodes. Therefore, the probability of an object crossing a dividing plane decreases exponentially with the height of the nodes separated by that plane. This stands in marked contrast to the case where there is no temporal coherence, and dynamic objects jump randomly between frames: in that case, the probability of an object crossing a separating plane increases exponentially with the height of the nodes.

Further improvement may be attained by combining the LCA finding stage with the deletion of the primitive from the octree, since both operations take place during a bottom-up search of the octree.

If every primitive may be associated with several octree nodes (as in the hierarchical Z-buffer algorithm) rather than with a single node, then this search up the octree begins at the set of lowest-level nodes with which the object is associated. Each iteration in the search refers to a certain level in the tree; the set of relevant nodes in that level includes those with which the primitive is explicitly associated, as well as ancestors of lower-level associated nodes. The search continues until the set reduces to a single node, then continues as for the case of primitives associated with a single node.

If there is a dynamic object o composed of several primitives, they can all be grouped together for the purpose of finding the least node, v=LCA(o, new_config), containing all the primitives in o at their old and new configurations; the primitives are deleted from the subtree under v and then inserted at the new locations. Conversely, under the naïve algorithm N, it would be better to move primitives to their new positions one by one: the primitives which have yet to be moved can act as place holders, preventing the unnecessary deletion of octree nodes.

If there are two dynamic objects, a and b, then it is worthwhile to group them if the nodes $LCA_a$ and $LCA_b$ coincide, or if one of them is an ancestor of the other and not too high above it. If there are more than two dynamic objects, they should be grouped so in every group the height difference between the LCA's of the different objects is not too great, and one of these LCA's is an ancestor of all the rest.

Figure 4A:
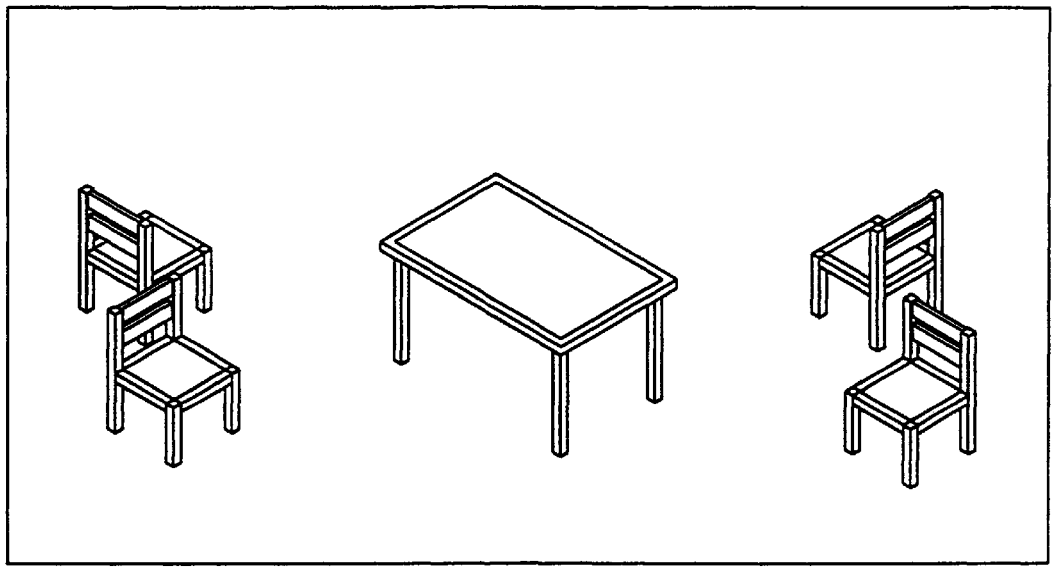
FIGS. 4a and 4b show pictorially two test scenes used for evaluating the method according to the naïve and basic update methods, respectively.

Referring now to FIG. 4a there is shown a first test scene used for evaluating the performance of the implementation of the octree update algorithm for dynamic primitives associated with multiple octree nodes, without grouping. The first test scene is very simple, consisting of a small cube moving inside a larger one. The small cube was repeatedly moved parallel to the x axis, in steps equal to half its side length, such that its distance from the nearest edge of the large cube remained equal to the small cube's side length. The total octree update time was measured at all steps. The octree updating algorithm consistently out performed the naïve algorithm discussed above. The exact speedup achieved depended on the ratio of cube sizes; generally, it was found to be proportional to the logarithm of the ratio of cube sides. This is due to the fact that the depth of the octree depends on the proximity between objects in the model. As the small cube becomes smaller and closer to the large cube's edge, the octree must become deeper to separate the two objects; this directly affects the run time of the naïve algorithm, but has less effect on the bottom-up octree updating algorithm, in which most update operations are not dependent on the octree's height.

Figure 4B:
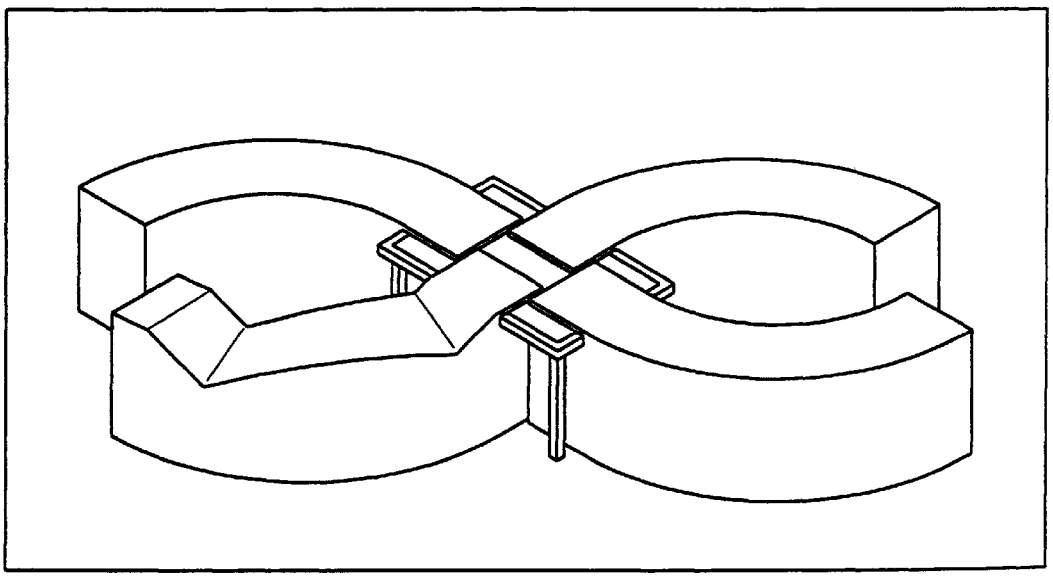

FIG. 4b shows a second test scene which models a table for four, complete with chairs, plates, glasses and candles and is more complicated (and more realistic) than the first test scene shown in FIG. 4a. The model contains 5745 geometrical elements (in this particular case polygons), resulting in an octree of depth 11. The dynamic object for the second test scene is again a small cube, this time circling around one of the candlesticks in 1° increments. The octree update algorithm according to the invention achieved a speedup of 2.7 for the second test scene shown in FIG. 4b.

In contrast to the first test scene shown in FIG. 4a where the entire octree was built just for the dynamic object, in the second test scene shown in FIG. 4b, almost all of the octree is constructed for the static parts of the model. Most of the speedup in the second test scene is not the result of eliminated node deletions, but of a shortened search down the octree each time the dynamic object is inserted into the octree at a new position.

Having described the first approach of minimizing the time required to update the structure for a dynamic object, there will now be described the second approach of minimizing the number of dynamic objects for which the structure has to be updated. Better performance can be achieved by considering the purpose for which the spatial data structure is being updated. If there is known in advance, for each dynamic object, a bounding volume being some region of space which completely contains the object for the entire duration of the animation sequence, then these volumes can be inserted into the model's spatial data structure; a dynamic object may be ignored unless the visibility culling algorithm finds its bounding volume to be visible. Such bounding volumes can be found, for instance, for doors revolving on hinges, railroad cars moving on tracks etc. Performance in such cases depends on the tightness of the bounding volumes. In one extreme case, nothing is known about the dynamic objects' possible locations, and the bounding volumes are equal to the entire model space; since these volumes are (almost) always visible, each dynamic object must be examined at every frame, so visibility calculation is not output-sensitive. In the other extreme case, the bounding volume is very tight and is identical to the object itself; in fact, the dynamic object becomes static, since it has nowhere to move, and visibility calculation becomes as output-sensitive as it is with a static model.

It is not always possible to find bounding volumes for the entire period of the animation sequence; it is particularly difficult in interactive applications such as virtual reality (VR), simulators and games, where the dynamic objects' courses may not be known in advance and the animation period might be unlimited. Even if bounding volumes can be found, they may be too big and loose, and not contribute much toward output sensitivity.

Therefore, in accordance with the invention temporal bounding volumes (TBVs) are calculated for shorter periods of time, rather than for the whole animation sequence. For example, if a maximum velocity is known for each dynamic object, then, given an object's position at a certain time, it is possible to compute a bounding sphere for its location at any future time. In more general cases, TBVs do not have to be spheres—for instance, a dynamic object may have a maximum velocity as well as preset tracks, or the maximum velocity or resistance to movement might be different in different directions. The TBVs are based on some known constraints on the possible changes in the dynamic objects, e.g. maximum linear and/or rotational velocity and/or acceleration, non-penetration through walls and floors etc. The constraints used to construct the TBVs can be imposed by the user interface of an interactive system or by stimulation rules, e.g. physically-based constraints such as non-penetration of solids. The constraints are not necessarily absolute, but can be probabilistic; i.e. the objects are not required to follow these constraints at all times, but are only assumed to do so with some degree of probability. The possible changes in a dynamic object include any geometric modification, including translation, rotation, scaling, shearing, change of articulated object configuration and arbitrary deformation. Generally, it is assumed that there is some way to find a bounding volume for each dynamic object from the time of the current frame until any desired moment in the future. This future moment constitutes an "expiration date" for the TBV; the period of time until that date is the bounding volume's validity period. A dynamic object which has been hidden should only be considered if its bounding volume becomes visible, or if the volume's expiration date arrives, or if the object violated some probabilistic constraint by which the volume was constructed.

It is to be noted that the temporal bounding volumes are calculated on the fly, and that no prior knowledge of the objects' trajectories is necessary. Thus we assure compatibility with interactive applications in which this information is not available in advance, such as simulations, games and virtual reality (VR).

Once a dynamic object has been checked and found not visible, there remains the problem of choosing the right expiration date for its TBV. If the chosen date is too soon, then the dynamic object will have to be considered again before long, thus decreasing efficiency; on the other hand, if the date is too far in the future, the bounding volume might be too loose, and become visible after a short time.

If the viewpoint is stationary, and most of the occlusions in the scene are by static objects (e.g. walls in a building), then the optimal validity periods for TBVs can be calculated exactly: starting with an initial validity period of one frame, repeatedly doubling the period until the bounding volume is no longer hidden by static objects, then using binary search to find the exact moment at which the volume starts to become visible. The rendering process must keep an event queue of expiration dates, similar to priority queues used in simulation. As long as the bounding volumes are tight enough, output sensitivity will be maintained, since most volumes will remain invisible throughout their validity period.

If the viewpoint is not stationary, the method described above will not necessarily find optimal expiration dates. Since it finds TBVs which are "almost visible", i.e. will become visible in just one frame's time, even the slightest movement of the viewpoint might reveal a part of the volume to the viewer, thus necessitating reference to the dynamic object. Therefore, if the viewpoint is movable, it would be better not to use such long validity periods. A better choice might be to use shorter periods (e.g. by half), to get smaller bounding volumes which will take longer to be revealed. Alternatively, adaptive validity periods may be chosen such that if the last period for a dynamic object's TBV were too short (the TBV expired before it was revealed), then the next TBV for the same object will have a longer validity period; in the opposite case, it will have a shorter period.

TBV technique as described above may be implemented in conjunction with the hierarchical Z-buffer visibility algorithm: TBVs optimize the updating of an octree; the visibility algorithm draws the scene using this octree, and detects which TBVs have become visible. Dynamic objects should either have their trajectories available in advance as an animation script, or just have maximum known velocities or some other known motion constraint.

Figure 5A:
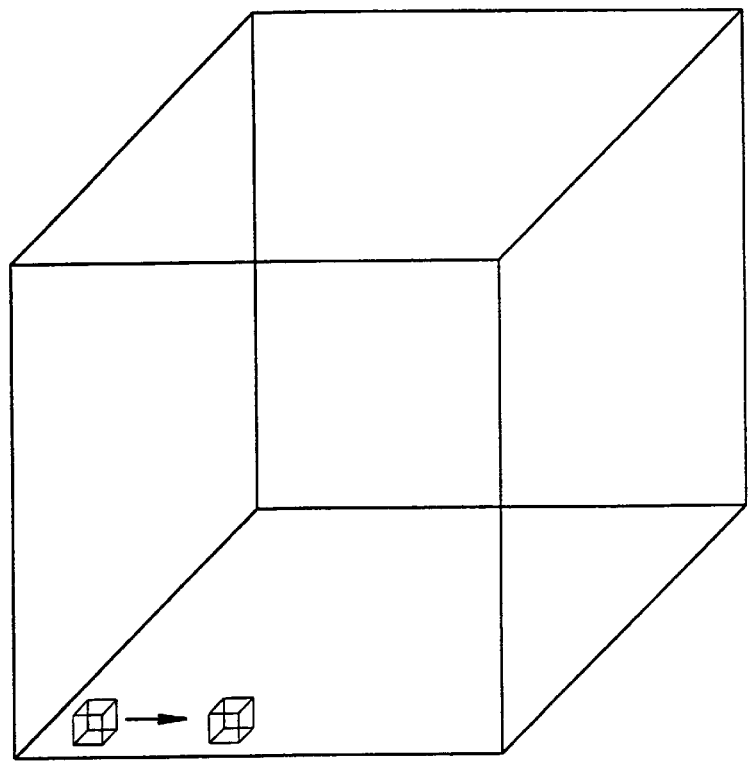
FIGS. 5a and 5b show respectively pictorial representations of a 3D object and a temporal bounding volume used in a method according to a second embodiment of the invention.
Figure 5B:
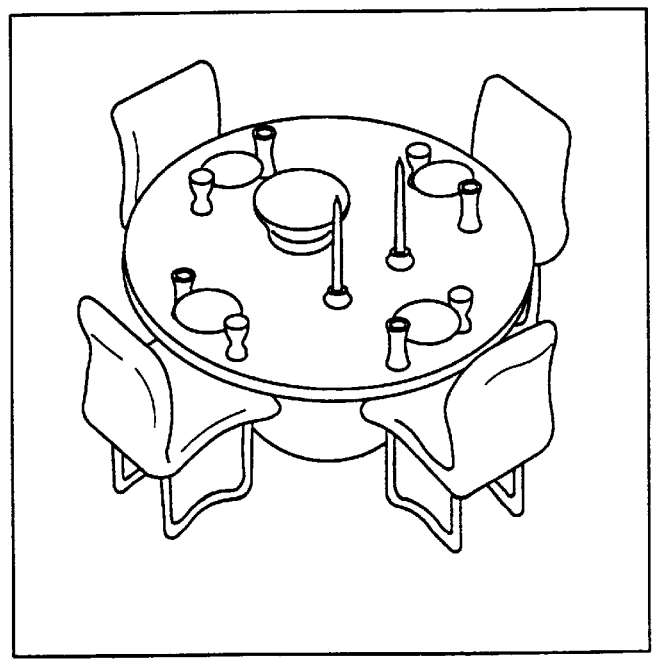

Referring to FIGS. 5a and 5b, the first case is shown wherein bounding volumes are constructed as the sweep surfaces of the objects' bounding boxes along the trajectory curves. Thus, FIG. 5a shows a typical room which forms the basis for a graphic model containing a stationary table having on opposite sides thereof respective pairs of chairs moving towards the table. The closer chair on the left hand side of the table is subjected to a slight wobble during its translational motion towards the table. FIG. 5b shows the resulting temporal bounding volume for the four chairs.

In the second case where only the maximum known velocities of the dynamic objects are known, the bounding volume for each dynamic object is a sphere centered around the object's last known position; the sphere's radius is its validity period times the maximum velocity (plus the object's radius). Validity periods can be either constant, adaptive, or maximal (extending to the end of the animation sequence, if it is known).

Figure 6A:
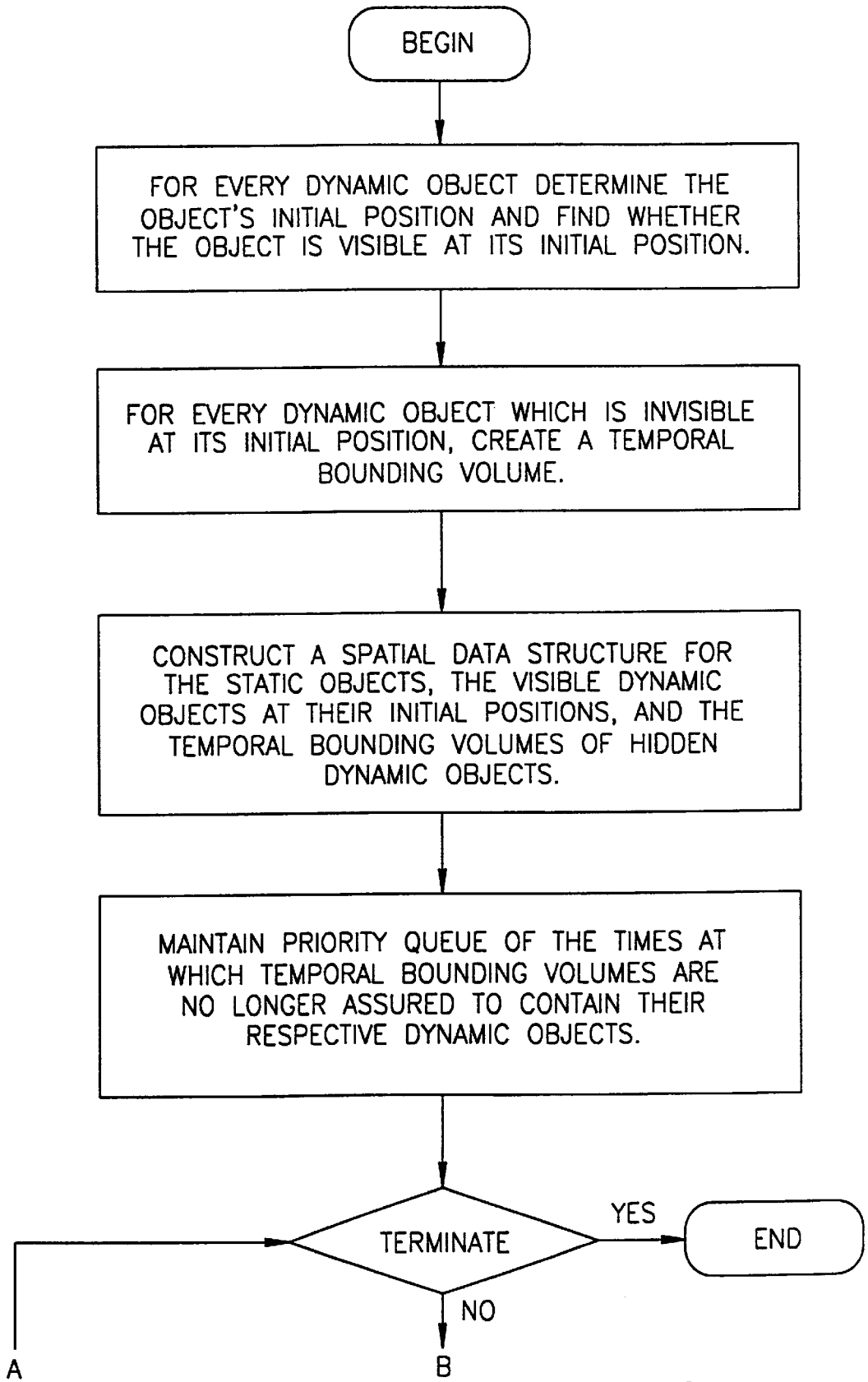
FIGS. 6a, 6b and 6c are a flow diagram showing the principal operating steps in a main and subsidiary procedure associated with the second embodiment of the invention.
Figure 6B:
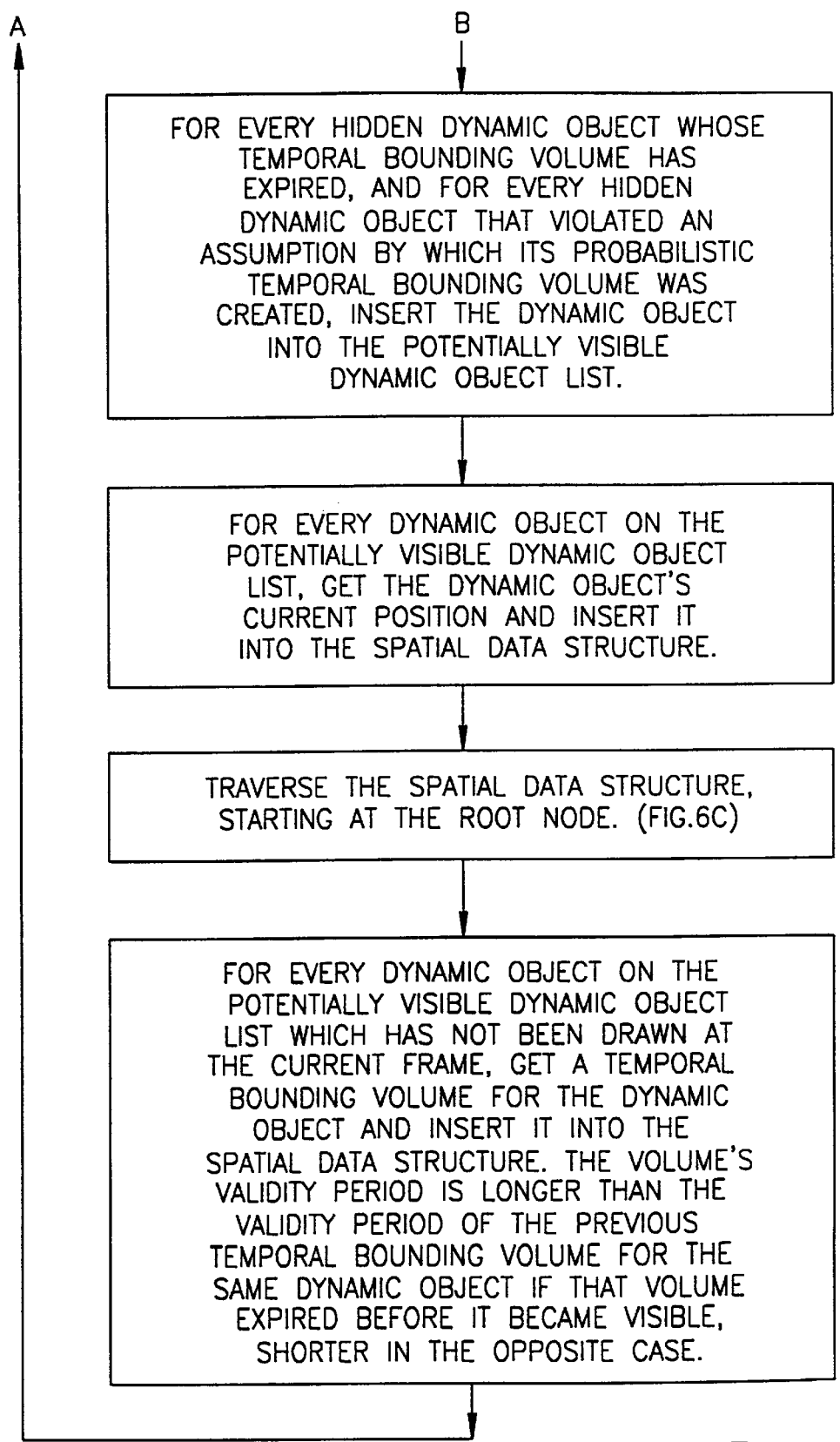
Figure 6C:
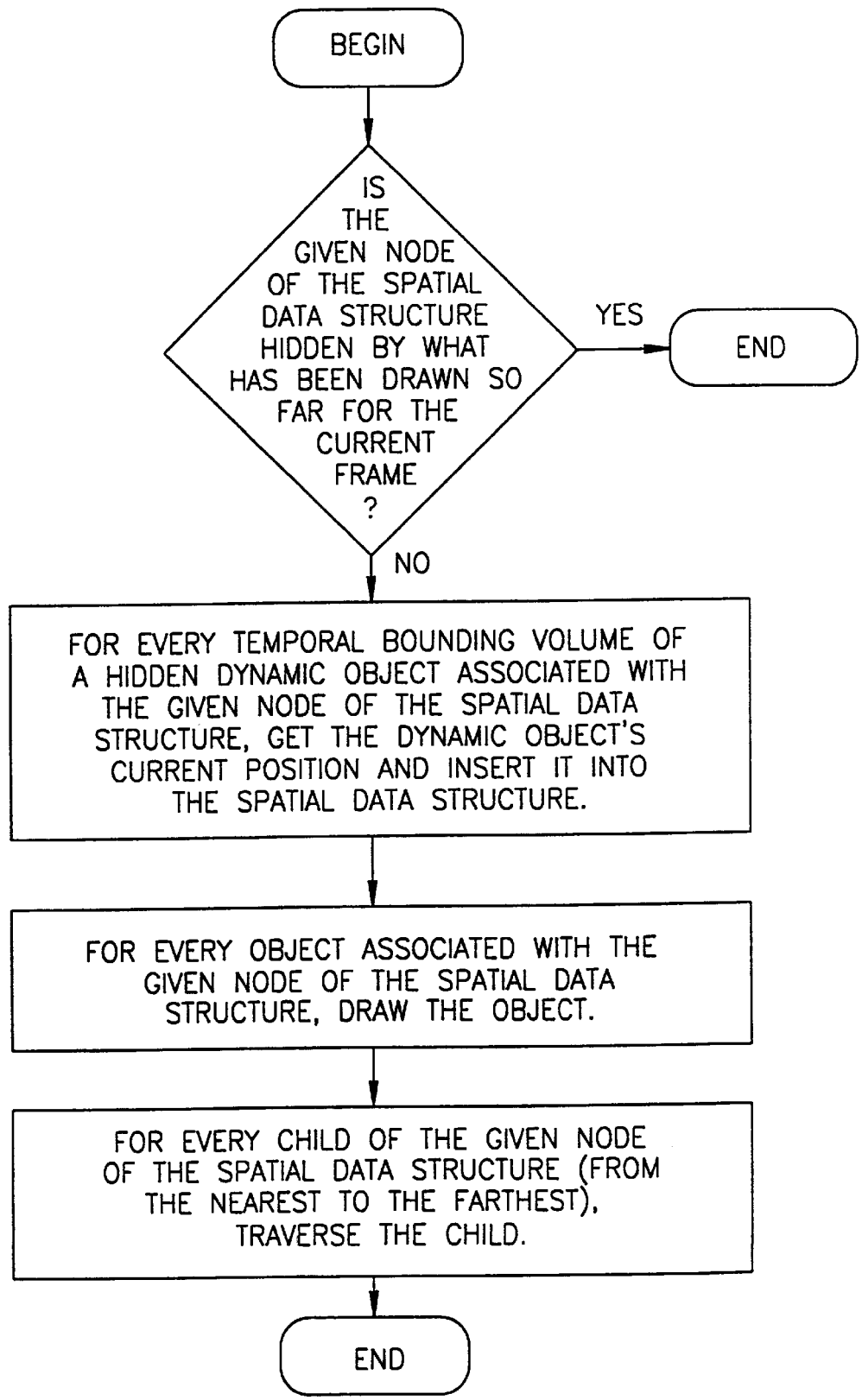

FIGS. 6a, 6b and 6c illustrate a flow diagram showing the principal operating steps in a main and subsidiary procedure, respectively, associated with a first embodiment of the invention for accelerating the rendering of successive images of a 3-dimensional graphics scene.

In an initialization step (a) as shown in FIG. 6a, there are performed the steps of:

(i) determining which of the dynamic objects are visible and which are hidden at their initial positions, (ii) creating temporal bounding volumes for the hidden dynamic objects consequent to projected motion thereof during a respective time period Δt not necessarily identical for all dynamic objects, (iii) constructing a spatial data structure containing the static objects, the visible dynamic objects at their initial positions and the hidden dynamic objects' temporal bounding volumes, and (iv) maintaining an event queue of the times at which the temporal bounding volumes are no longer assured to contain their respective dynamic objects.

Thereafter, in step (b) the hidden dynamic objects which are no longer assured to be contained within their respective temporal bounding volumes (either because the event queue so reported or because the objects' changes violated some assumption by which probabilistic temporal bounding volumes were created) are inserted into the spatial data structure instead of the respective temporal bounding volumes.

Subsequently, in step (c) shown as separate subsidiary procedure in FIG. 6c, the spatial data structure is output-sensitively processed (traversed) so as to render its visible parts and so as to replace visible temporal bounding volumes by their respective dynamic objects. In the case where the spatial data structure is hierarchical, the traversal is a recursive procedure; whilst in the case where the spatial data structure is non-hierarchical as in a regular grid, the traversal is iterative. In step (d) temporal bounding volumes are created for the hidden dynamic objects which do not already have temporal bounding volumes and these are inserted into the spatial database instead of the hidden dynamic objects. The times at which the temporal bounding volume will no longer be assured to contain their respective dynamic objects (the "expiry times") are then inserted into the event queue. Thereafter, steps (b) to (d) are repeated for each image to be rendered.

It should be noted that the term event queue should be construed in a logical sense, i.e. it is not bound to any specific data structure relaization.

Figure 7A:
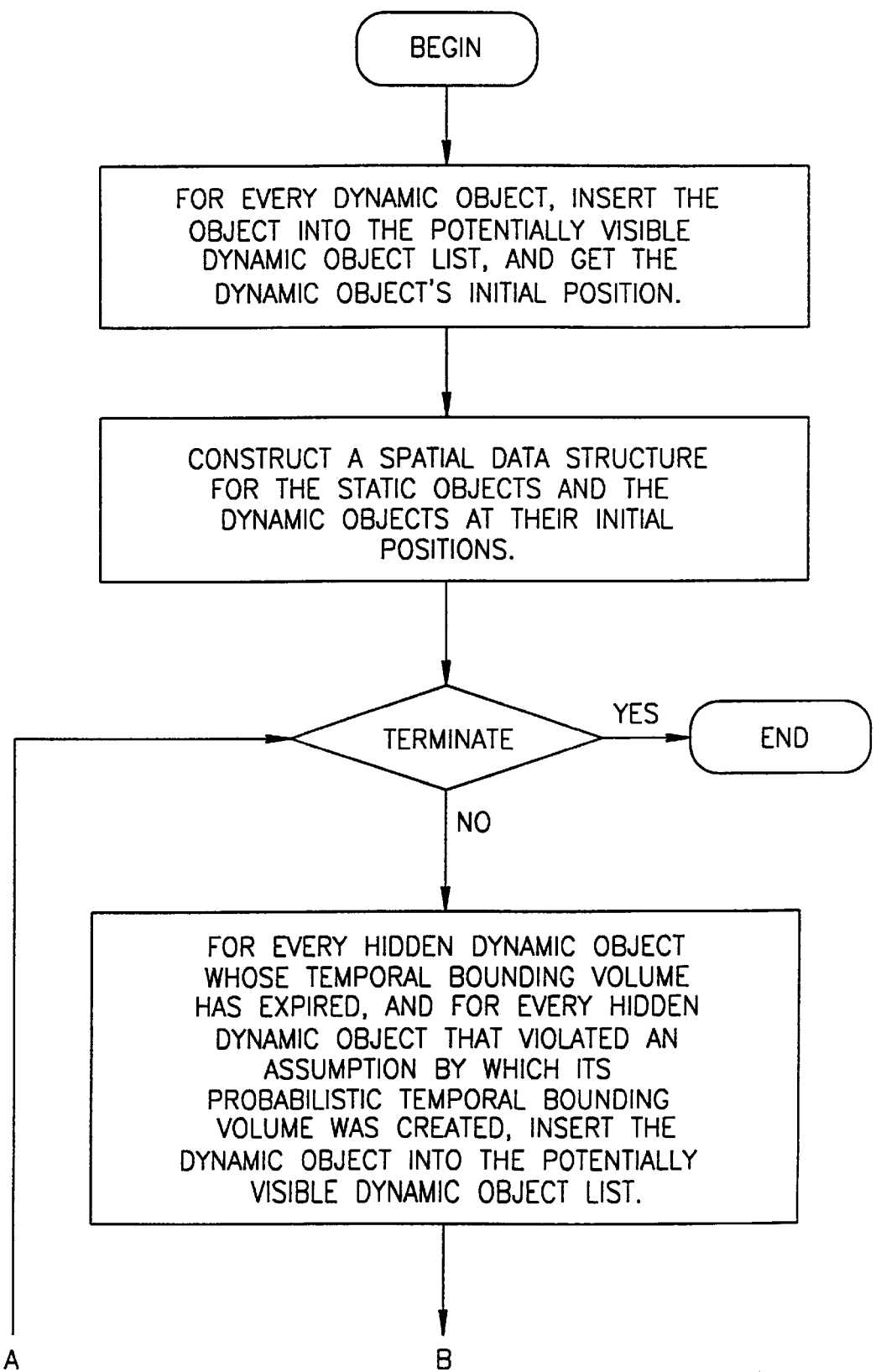
FIGS. 7a and 7b is a flow diagram showing the principal operating steps associated with the main procedure in a variation of the second embodiment of the invention.
Figure 7B:
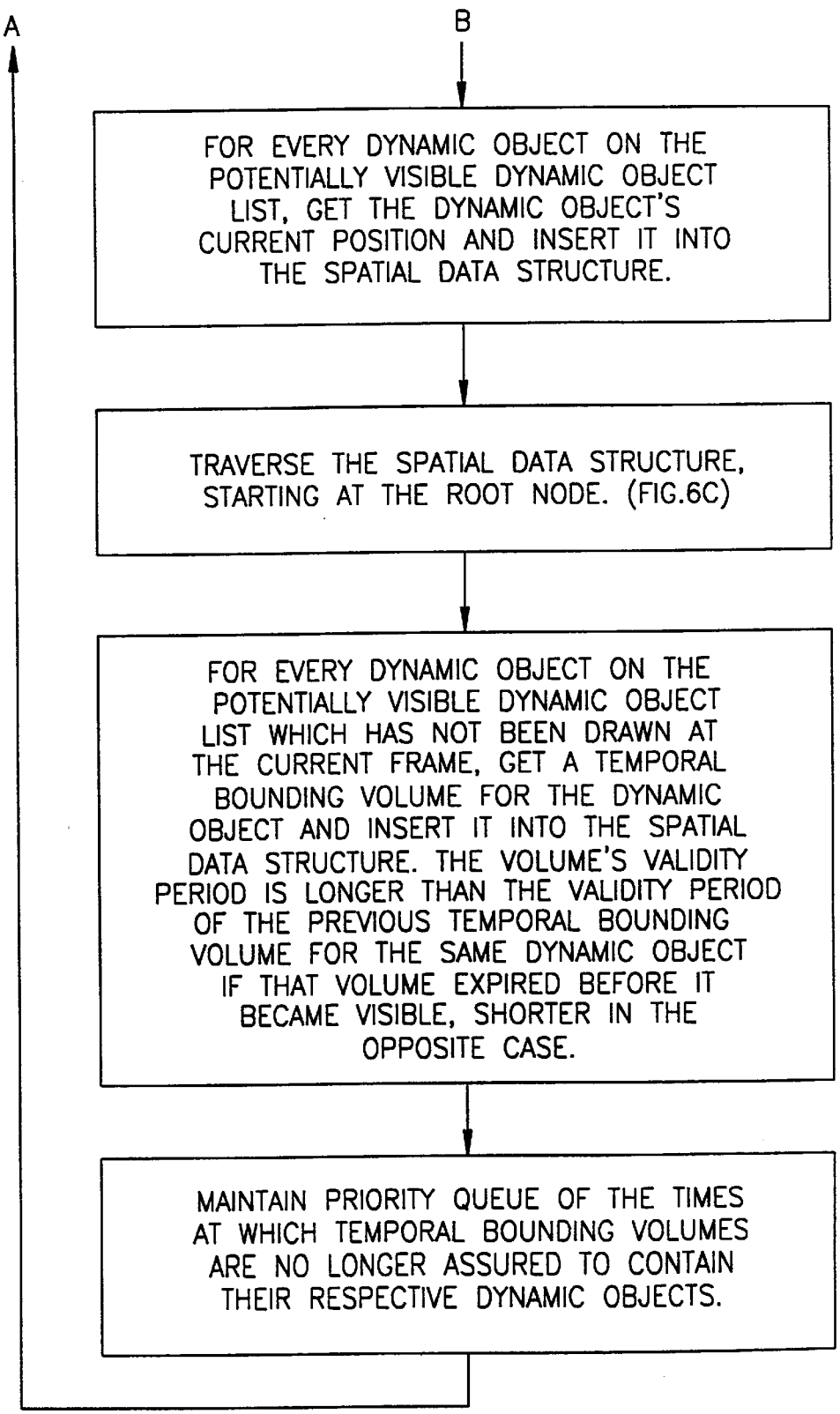

Reference is now made to FIG. 7 which is a flow diagram showing the principal operating steps according to a variation of the main procedure described above with reference to FIG. 5a of the drawings. The essential difference between the two embodiment lies in the manner in which dynamic objects are initially distinguished as being hidden or potentially visible. In the embodiment shown in FIG. 6a, this is determined explicitly during the initialization step (a). In the variation shown in FIG. 7, the initialization step (a) creates a potentially visible dynamic object list of all potentially visible dynamic objects and inserts all the dynamic objects therein. During subsequent processing for rendering the first image, it becomes apparent that actually some of the dynamic objects in the potentially visible dynamic object list are, in fact, hidden, and the potentially visible dynamic object list is updated accordingly. Since, in this case, no explicit distinction between hidden and potentially visible dynamic objects is made in the initialization step (a), the initialization itself is faster. However, this is at the expense of initially more processing during the traversal procedure (step (c) while rendering the first image.

The performance of the temporal bounding volume technique (TBV) was compared to that of the hierarchical Z-buffer algorithm, updating the octree for each dynamic object at every frame (HZB), and to simply render all the objects at every frame by an ordinary Z-buffer (ZB). All tests were carried out on an SGI IRIS Indigo XS24 4000 workstation with a hardware Z-buffer, using the GL library for display. The scene models used in the tests were buildings consisting of interconnected rooms, each furnished with a table; the dynamic objects were chairs which followed trajectories approaching the tables as shown in FIG. 4a. To test the net improvement gained by the TBV technique, the octree was updated naïvely by both TBV and HZB.

Figure 8A:
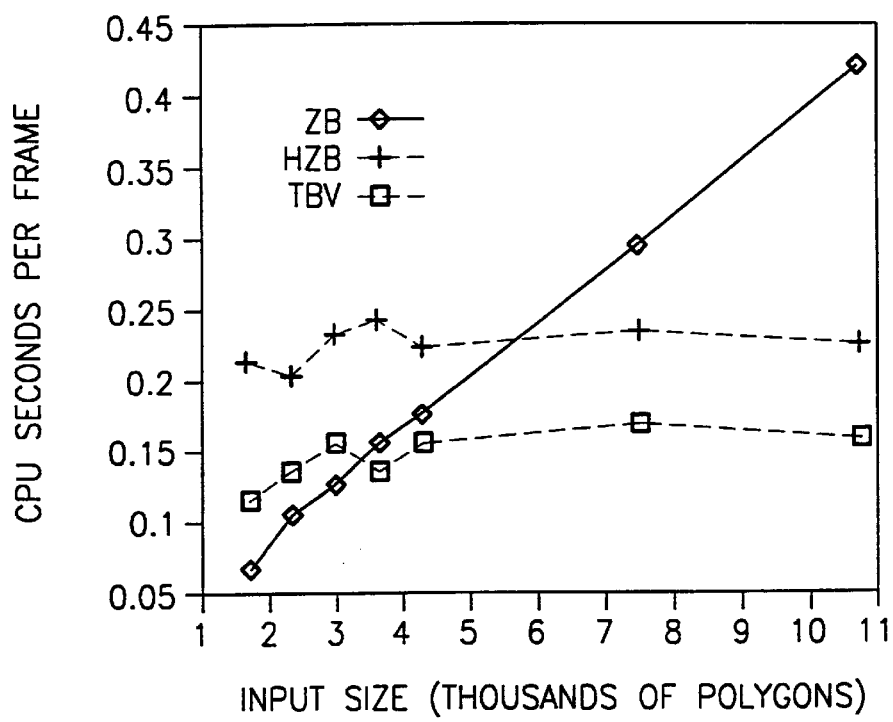
FIGS. 8a, 8b and 8c are graphical representations showing the performance of the algorithm according to the second embodiment of the invention under different conditions.
Figure 8B:
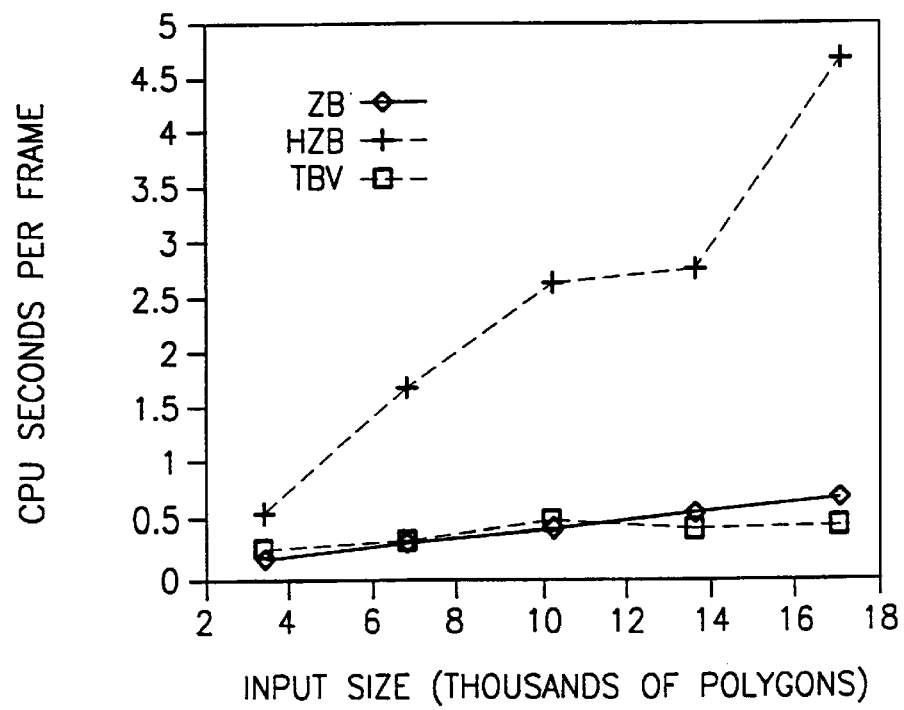
Figure 8C:
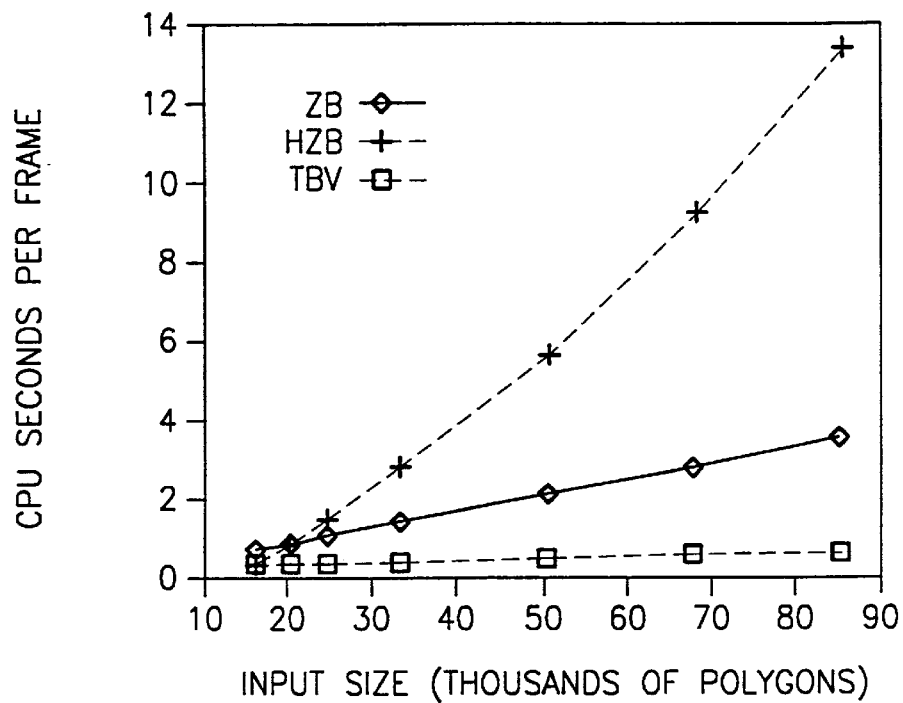

FIGS. 8a, 8b and 8c are graphical representations showing the performance of the algorithm according to the invention under different conditions. FIG. 8a shows the performance of the three techniques for models of increasing size, having a varying number of static polygons and the number of dynamic polygons being fixed at 1100. As can be expected, ZB's runtime is linear in the size of the model, while those of HZB and TBV are nearly constant since the same number of objects are visible regardless of the model's size. TBV does slightly better because only half of the dynamic objects are actually visible.

In FIG. 8b, the performance of the three techniques is compared for models of increasing size, where the ratio of the number of dynamic objects to the total number of objects in the model is fixed to a constant 80%. Thus there are always four moving chairs in each room. In this case, both ZB and HZB have a linear runtime with respect to the size of the model; HZB does much worse than ZB because of the need to keep the octree up-to-date, incurring considerable overhead. TBV eliminates many of these octree updates, thus improving performance considerably.

FIG. 8c presents the results obtained by the three techniques for increasing numbers of dynamic objects within a static model of fixed size comprising 125 rooms and tables represented by 16,250 static polygons and a varying number of dynamic polygons. This demonstrates that the performance gain achieved by TBV increases with the proportion of dynamic objects in the model.

It will thus be seen that the TBV algorithm according to the invention is superior to existing visibility algorithms, most notably when most of the scene polygons are dynamic.

The TBV technique eliminates the need to update the visibility algorithm's underlying data structure (octree or BSP tree) for most dynamic objects, namely those which are invisible and with a TBV that is still valid. However, the technique has another, very important advantage: in addition to the auxiliary data structure, the scene model itself does not have to be updated for these hidden objects, but can be left with their old configurations and properties. This may save a significant amount of calculation if these objects exhibit complex behaviors, deformations etc. In the model, the data about these objects will be incorrect, but this will not matter since they are invisible anyway.

Consider a multi-user virtual environment, e.g. Funkhouser's RING system[2]. Many users can roam simultaneously through a shared 3D virtual building, seeing each other as graphic representations in the appropriate places in the building. In a client-server configuration, each user's workstation acts as a client, and a central server (or a network of servers) updates each client as to the geometry it might see; some of this geometry may depend on other clients. The server itself is constantly updated of every user's geometry. Using the TBV technique, some communication can be saved: the server can keep TBVs for those users which are currently not seen by any other user; it will only request geometry updates from those clients that become potentially visible, or whose TBV expires. Alternatively, the server can have each pair of clients establish a peer-to-peer communication channel between them when they first see each other. Each client then performs its own visibility calculation; when the TBV technique determines that another user may become visible, an update is asked of that other user's client through the peer-to-peer link.

TBVs can eliminate still more communication overhead in a distributed VR system with no central server, such as the VRMUD environment described by Earnshaw et al.[7] or with a server that holds only the static parts of the model. Instead of having every station broadcast its user's movements and deformations, each station can specifically keep track of just those other users which may be visible to it. For all the other users it will keep TBVs, and request a geometry update once a TBV expires or becomes potentially visible.

The algorithm has been implemented by extending the hierarchical Z-buffer algorithm to dynamic scenes, described in detail above with particular reference to FIGS. 6a and 6b of the drawings. Currently the system executes on a single workstation: the viewpoint moves through the scene at the user's control, and all the other users are simulated by the program.

Figure 9:
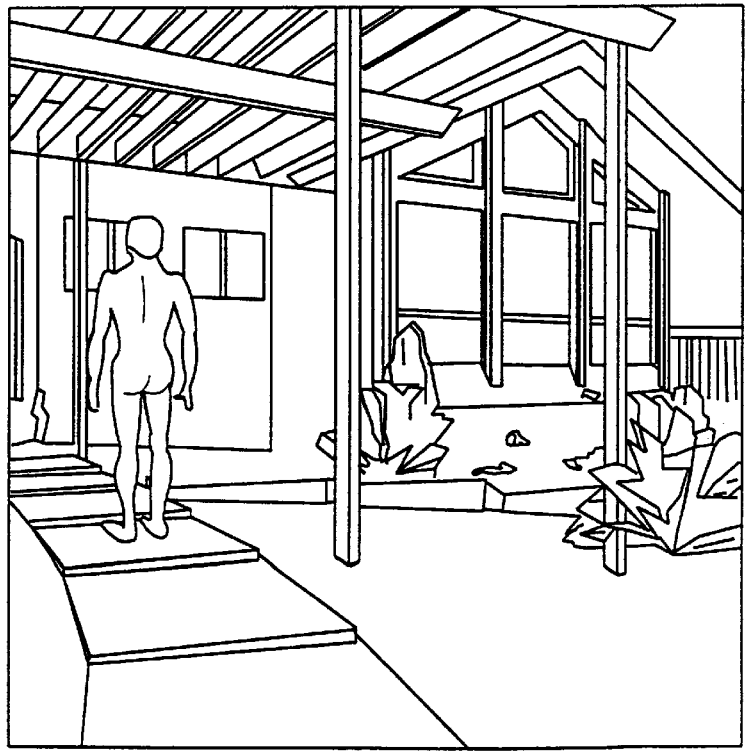
FIG. 9 is a pictorial representation of a test scene used for evaluating the method according to the second embodiment of the invention.

FIG. 9 shows another test scene used to test the performance of various rendering techniques using a Silicon Graphics Indy R5000. The number of static objects and the number of visible dynamic objects were kept constant at 13,220 and 14,946 polygons, respectively; the number of hidden dynamic objects was varied by adding men inside the building.

Figure 10:
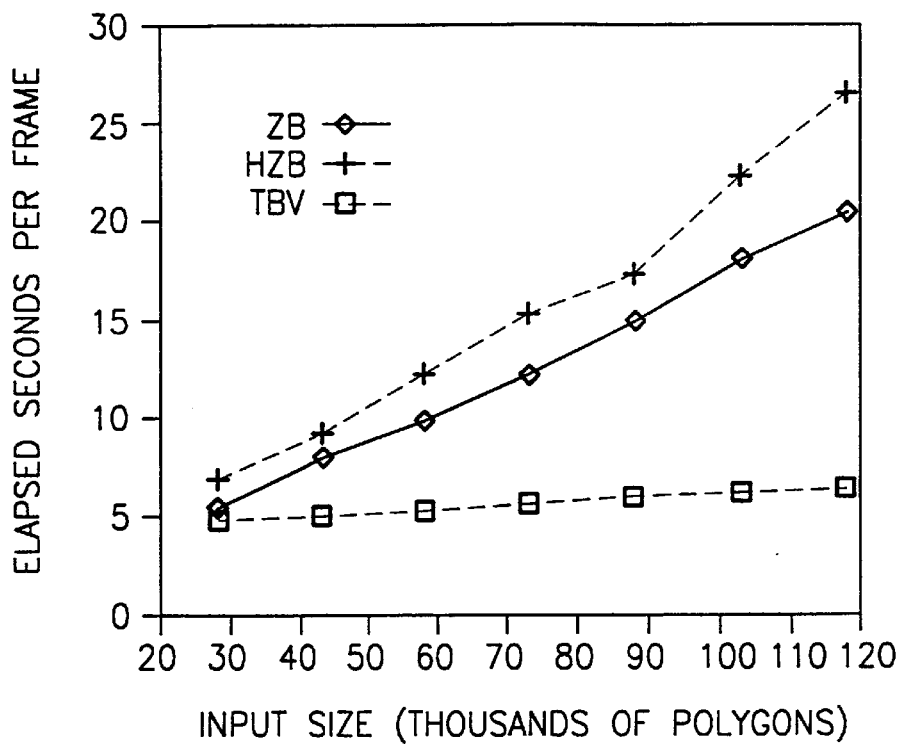
FIG. 10 is a graphical representation showing the performance of the algorithm according to the second embodiment of the invention under different conditions for the test scene shown in FIG. 9.

FIG. 10 shows that the runtime of the plain Z-buffer algorithm (ZB) is linearly proportional to the total number of objects in the scene. The hierarchical Z-buffer algorithm (HZB) requires that the octree be updated for every dynamic object, and therefore does even worse than ZB. The TBV technique according to the invention updates the octree only for the visible dynamic objects, and its runtime is almost constant in comparison to ZB and HZB.

It will be appreciated that whilst the preferred embodiment has been described with particular reference to dynamically updating an octree database structure, the invention is equally applicable to other database structures: both hierarchical and non-hierarchical. The modification with regard to non-hierarchical spatial data structures, such as regular grid structures, has already been discussed above with reference to FIG. 6b of the drawings.

However, it is to be noted that other hierarchical spatial data structures are also contemplated by the invention. For example, the invention can be used to dynamically update a BSP tree which is subsequently displayed by Naylor's visibility culling algorithm[4]. However, this is not a straightforward generalization of the same technique, because BSP trees are inherently different from octrees and k-D trees: BSP trees (with leaf "in/out" attributes), as used by the visibility algorithm, represent the objects themselves, whereas octrees and k-D trees are merely auxiliary data structures, supplementing a boundary representation.

In order that the visibility algorithm be output-sensitive with respect to the number of dynamic objects, the following data structures are maintained:

D a set of all the dynamic objects, each having a unique identifier (ID) and a time of last observation. Those of the dynamic objects that are hidden also have a TBV, specified by a BSP tree; an expiration time for the TBV; and a set of pointers to the leaves of S (see below) that intersect the TBV.

S a BSP tree that is the union of the static scenery and the TBVs of hidden dynamic objects in D. A set of dynamic objects IDs is associated with each leaf of bf S; an object's ID is in the set if it is invisible and its TBV intersects the leaf.

T a BSP tree that represents the entire scene, including the static scenery, visible dynamic objects and TBVs of hidden dynamic objects. Each leaf of T has a set of dynamic object IDs; an ID is in the set if the corresponding dynamic object is either visible and intersects the leaf, or hidden and its TBV intersects the leaf.

Q an event queue of TBV expiration events for hidden dynamic objects.

V a set of IDs of visible dynamic objects.

Each of the "dynamic objects" referred to above can be either an avatar of some other user or an autonomously moving object, controlled by a program, e.g. Java-controlled objects in VRML 2.0 models.

The algorithm uses two subroutines: del_TBV (delete temporal bounding volume) accepts an ID of a hidden dynamic object, and changes the object's status from hidden to (potentially) visible; uni_vis (unite a visible object into the scene) handles a visible object.

del_TBV (ID):
1. Delete ID from the leaves of S that contain ID.
2. Merge leaves of S if possible.
3. V←V∪(ID).

In step 1 of del_TBV, the leaves of S which contain ID are given by the set of leaves maintained with the corresponding dynamic object in D. In step 2, the leaves that should be merged are siblings that contain the same set of IDs after the deletion of step 1. The merge proceeds bottom-up, terminating at siblings that are either not both leaves or have different ID sets.

uni_vis(ID):
1. Obtain a BSP tree B representing the current configuration of the dynamic object corresponding to ID.
2. T←T∪B. During the union, insert ID into every leaf of T that B intersects.

In step 1 of uni_vis, B can be obtained, e.g., through a communication link. The exact content of the communication may depend on the nature of the dynamic object. For example, if the object is rigid, then all the needs to be sent (after the first frame) are translation and rotation parameters, possibly as a 4×4 homogeneous transformation matrix A; the tree B is obtained by multiplying every coordinate in the object's BSP tree by A, and every plane equation by $A^{-1}$. For an articulated object, a transformation is needed for each rigid segment. For a deformable object, the communication can include some deformation parameters, or a complete BSP tree representing the object's current form.

The union operation in step 2 can be performed as discussed by Naylor et al.[8]

At each user's workstation, all the dyndynamic objects in D are initially marked as visible, and have a time of last observation earlier than the first frame. S is initialized to the union of all the static objects, T and Q are empty, and V initially contains the IDs of all the dynamic objects.

At every frame, the following steps are performed at each station:
1. For each object ID of an expired TBV, as determined by Q, and for each ID of an object which violated a probabilistic constraint by which its TBV as created, do del_TBV(ID); merge leaves if possible.
2. T←S
3. For each ID in V do uni_vis(ID).
4. Operate Naylor's visibility algorithm on T, displaying visible faces. At each leaf of T encountered during this traversal, for each ID of an invisible object whose TBV intersects the leaf, do:
   (a) del_TBV(ID);
   (b) uni_vis(ID).

For each ID of a visible object intersecting the leaf, update the time of last observation associated with ID in V. Upon backtracking from a node, merge leaves if possible.
5. For each dynamic object in V whose time of last observation is earlier than the current frame, do:
   (a) Obtain a TBV for the object until some time in the future;
   (b) Insert the TBV into Q and into S;
   (c) Delete the object's ID from V.

Step 1 of the algorithm handles hidden dynamic objects whose TBVs have expired by deleting their TBVs and moving them to the set V. Note that V contains potentially visible dynamic objects, rather than objects which are certainly visible; at this stage it is too early to determine certain visibility, so we simply bundle the objects whose TBVs have expired with those that are potentially visible because they were visible in the previous frame. The leaves that should be merged are siblings that contain the same set of IDs after the deletion.

In steps 2 and 3, the BSP tree T representing the entire scene is constructed. It is used in step 4, the heart of the algorithm.

Step 4 displays the scene, and handles exposed TBVs by treating them the same way they would have been handled had they expired rather than becoming visible. This step requires special care, because it traverses an hierarchical data structure and modifies it at the same time. Therefore we postpone merging sibling leaves that contain the same set of IDs until we're about to backtrack from their parent. Note also that the union operation in step 4(b) preserves the overall structure of the BSP tree, but might replace leaf nodes with subtrees; if this happens, the new subtree should be traversed too.

Finally, step 5 handles dynamic objects which cease being visible. If such an object is controlled by another station, then that station should provide a BSP tree representing the TBV for the object, upon request; the request should also specify the time in the future until which the provided TBV should be valid.

The algorithm achieves the goal of being output-sensitive with respect to the number of dynamic objects by ignoring such objects unless they are visible. While the algorithm involves some overhead, its amount does not depend linearly on the size of the entire scene. For most frames, no time is wasted on updating and displaying invisible dynamic objects, not even to discover that they are in fact invisible; they are simply not reached during the traversal of the BSP tree. Hidden dynamic objects require processing only if their TBVs expire or become exposed. If TBVs are chosen with sufficient care (e.g. if adaptive expiry is used), then TBV exposures only occur for a minority of the invisible objects, and TBV expiries become less frequent with time.

Static objects may be regarded as dynamic objects with zero velocity. However, visible dynamic objects are updated at every frame, and it would be undesirable to "update" visible static objects in the same way, especially if this update takes place over a slow network (although relatively few of the static objects may be visible). Therefore the algorithm treats static objects differently from dynamic ones.

It will be appreciated that the expiry times $\Delta t$ may be selected according to different criteria to those explained above. For example, the time period $\Delta t$ may be constant or set equal to a remaining time duration of the scene. Likewise, if desired, the time period $\Delta t$ may be set equal to a random time duration or may be inversely proportional to the velocity of the respective dynamic object.

Figure 11:
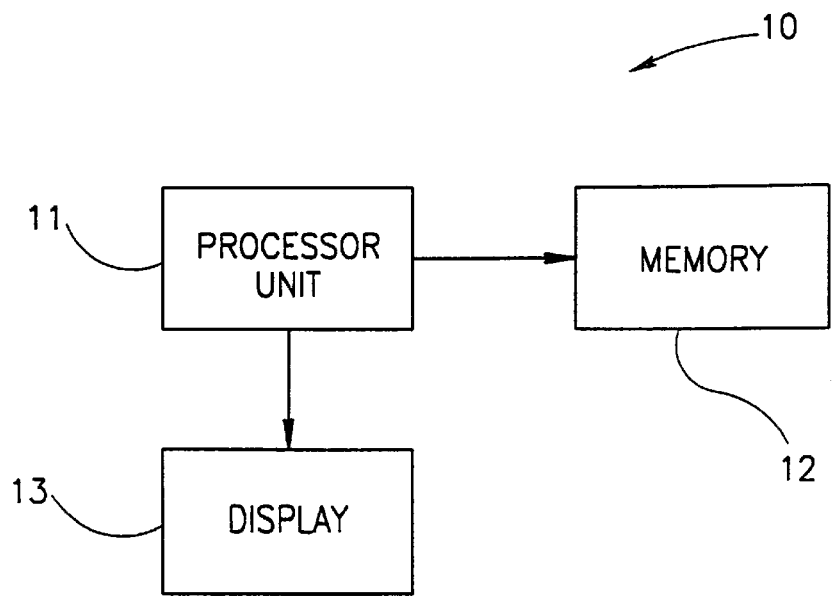
FIG. 11 is a block diagram showing functionally the principal components of a system for carrying out the invention.

Referring now to FIG. 11, there is shown a block diagram showing functionally the principal components of a system designated generally as 10 including a processing unit 11 coupled to a memory medium 12 and a display 13. The processing unit 11 may be a conventional CPU e.g. pentium commercially available from Intel Corporation. However, it will be appreciated that the system 10 need not be constructed using discrete components as depicted in FIG. 11. Thus, by way of further example, the processing unit 11 may, if desired, be realized using distributed processing units residing in respective local and remote sites such as in a network and so on.

The processing unit 11 is adapted to execute the various method steps described in detail above with particular reference to FIGS. 6a to 6c and 7 of the drawings, whilst utilizing a spatial data structure stored in the memory medium 12. The spatial data structure comprises static objects, visible dynamic objects; and temporal bounding volumes each relating to a projected motion of a respective hidden dynamic object during a respective time period $\Delta t$ not necessarily identical for all dynamic objects.

The user application program is executed under control of the processing unit 11 which is responsive to the spatial data structure for accelerating the rendering of successive images of a scene.

In the claims which follow, alphabetic and numeric characters used to designate claim steps are provided for convenience of description only, and do not necessarily imply any particular order of performing the steps.

The present invention has been described with a certain degree of particularity but it should be understood that various modifications and alteration may be made without departing from the scope or spirit of the invention as defined by the following claims.

We claim:

1. In a process for rendering a 3-dimensional graphics scene comprising a plurality of static and/or dynamic objects composed of geometrical elements, a method for accelerating the rendering of successive images of said scene comprising the steps of:
   (a) in an initialization step:
      (i) determining which of the dynamic objects are visible and which are hidden at their initial positions,
      (ii) creating temporal bounding volumes for the hidden dynamic objects consequent to projected motion thereof during a respective time period $\Delta t$ not necessarily identical for all dynamic objects,
      (iii) constructing a spatial data structure containing the static objects, the visible dynamic objects at their initial positions and the hidden dynamic objects' temporal bounding volumes, and
      (iv) maintaining an event queue of the times at which the temporal bounding volumes are no longer assured to contain their respective dynamic objects,
   (b) inserting the hidden dynamic objects which are no longer assured to be contained within their respective temporal bounding volumes, either because the event queue so reported or because the objects' motion violated some assumption by which the temporal bounding volumes were created, into the spatial data structure instead of the respective temporal bounding volumes,
   (c) output-sensitively processing the spatial data structure so as to render its visible parts and so as to replace visible temporal bounding volumes by their respective dynamic objects,
   (d) creating temporal bounding volumes for the hidden dynamic objects which do not already have temporal bounding volumes, inserting said temporal bounding volumes into the spatial database instead of the hidden dynamic objects and inserting into the event queue the times at which the temporal bounding volume will no longer be assured to contain their respective dynamic objects, and
   (e) repeating steps (b) to (d) for each image to be rendered.

2. For use with the method according to claim 1, an initialization step comprising:
   (i) determining which of the dynamic objects are visible and which are hidden at their initial positions,
   (ii) creating temporal bounding volumes for the hidden dynamic objects consequent to projected motion thereof during a respective time period $\Delta t$ not necessarily identical for all dynamic objects,
   (iii) constructing a spatial data structure containing the static objects, the visible dynamic objects at their initial positions and the hidden dynamic objects' temporal bounding volumes, and
   (iv) maintaining an event queue of the times at which the temporal bounding volumes are no longer assured to contain their respective dynamic objects.

3. For use with the method according to claim 1, a processing step comprising:
   (b) inserting the hidden dynamic objects which are no longer assured to be contained within their respective temporal bounding volumes, either because the event queue so reported or because the objects' motion violated some assumption by which the temporal bounding volumes were created, into the spatial data structure instead of the respective temporal bounding volumes,
   (c) output-sensitively processing the spatial data structure so as to render its visible parts and so as to replace visible temporal bounding volumes by their respective dynamic objects,
   (d) creating temporal bounding volumes for the hidden dynamic objects which do not already have temporal bounding volumes, inserting said temporal bounding volumes into the spatial database instead of the hidden dynamic objects and inserting into the event queue the times at which the temporal bounding volume will no longer be assured to contain their respective dynamic objects, and
   (e) repeating steps (b) to (d) for each image to be rendered.

4. The method according to claim 1, wherein a potentially visible dynamic object list is created of all potentially visible dynamic objects and step (a) includes the steps of:
   (i) initializing the potentially visible dynamic object list to contain all dynamic objects and the event queue to be empty, and
   (ii) if said scene contains static objects, constructing a spatial data structure containing the static objects; and step (b) comprises the steps of:
   (iii) inserting the hidden dynamic objects which are no longer assured to be contained within their respective temporal bounding volumes, either because the event queue so reported or because the objects' changes violated some assumption by which the temporal bounding volumes were created, into the potentially visible dynamic object list, and
   (iv) obtaining the current position of every object in the potentially visible dynamic object list and inserting it into the spatial data structure;
   there being further included the steps of constantly updating the potentially visible dynamic object list as previously hidden dynamic objects become visible and as previously visible dynamic objects become hidden.

5. The method according to claim 1, wherein a potentially visible dynamic object list is created of all potentially visible dynamic objects and step (a) includes the steps of:
   (i) initializing the potentially visible dynamic object list to contain all dynamic objects and the event queue to be empty, and
   (ii) if said scene contains static objects, constructing a spatial data structure containing the static objects.

6. The method according to claim 1, wherein a potentially visible dynamic object list is created of all potentially visible dynamic objects and step (b) includes the steps of:
   (i) inserting the hidden dynamic objects which are no longer assured to be contained within their respective temporal bounding volumes, either because the event queue so reported or because the objects' changes violated some assumption by which the temporal bounding volumes were created, into the potentially visible dynamic object list, and (ii) obtaining the current position of every object in the potentially visible dynamic object list and inserting it into the spatial data structure;

there being further included the steps of constantly updating the potentially visible dynamic object list as previously hidden dynamic objects become visible and as previously visible dynamic objects become hidden.

7. The method according to claim 1, wherein the spatial data structure is hierarchical and step (c) is performed recursively.

8. The method according to claim 7, wherein the spatial hierarchical data structure is an octree.

9. The method according to claim 7, wherein the spatial hierarchical data structure is an Binary Space Partitioning (BSP) tree.

10. The method according to claim 7, wherein the spatial hierarchical data structure is a k-D tree.

11. The method according to claim 1, wherein the spatial data structure is a regular grid and step (c) is performed iteratively.

12. The method according to claim 1, wherein step (d) is based on a predetermined object script in respect of at least one of the dynamic objects.

13. The method according to claim 1, wherein step (d) is based on predetermined motion and/or deformation constraints in respect of at least one of the dynamic objects.

14. The method according to claim 1, for eliminating unnecessary communications in a distributed system.

15. The method according to claim 1, for ray tracing a graphic object which is not necessarily seen directly but may be reflected by another graphic object or seen through another semi-transparent object or casts a shadow on another object.

16. The method according to claim 1, further including the step of displaying the resulting graphic images on a computer screen.

17. The method according to claim 1, wherein:

the scene is viewed from a stationary viewpoint, most of the hidden dynamic objects are hidden by static objects, and the time periods $\Delta t$ are calculated exactly by starting with an initial time period $\Delta t$ of one frame, repeatedly doubling the time period $\Delta t$ until the bounding volume is no longer hidden by static objects, and then using binary search to find the exact moment at which the bounding volume starts to become visible.

18. The method according to claim 1, wherein the scene is viewed from a non-stationary viewpoint, and the time period $\Delta t$ is reduced from an initial maximum value suitable for a stationary viewpoint so as to reduce the bounding volumes and thereby increase the time required for the hidden dynamic object to be revealed.

19. The method according to claim 1, wherein the time period $\Delta t$ is adapted in order that if a previous time period for a dynamic object's temporary bounding volume were too short such that the temporary bounding volume expired before the dynamic object was revealed, then a successive temporary bounding volume for the same dynamic object is created for a longer validity period, and vice versa.

20. The method according to claim 1, wherein the time period $\Delta t$ is constant.

21. The method according to claim 1, wherein the time period $\Delta t$ is set equal to a remaining time duration of the scene.

22. The method according to claim 1, wherein the time period $\Delta t$ is set equal to a random time duration.

23. The method according to claim 1, wherein the time period $\Delta t$ is inversely proportional to the velocity of the respective dynamic object.

24. The method according to claim 1, wherein steps (b) and (d) are based on probabilistic motion and/or deformation constraints: i.e. constraint which the objects are not necessarily guaranteed to obey at all times, but only assumed to obey with some degree of probability.

25. A memory medium containing a spatial data structure accessible to a user application program for accelerating the rendering of successive images of a scene; the spatial data structure comprising:

static objects and/or visible dynamic objects; and temporal bounding volumes each relating to a projected motion of a respective hidden dynamic object during a respective time period $\Delta t$ not necessarily identical for all dynamic objects.

26. A memory medium containing a user application program for accelerating the rendering of successive images of a scene; the user application program utilizing a spatial data structure comprising static objects, visible dynamic objects, and temporal bounding volumes each relating to a projected motion of a respective hidden dynamic object during a respective time period $\Delta t$ not necessarily identical for all dynamic objects;

said user application program performing the following steps:

(a) inserting the hidden dynamic objects which are no longer assured to be contained within their respective temporal bounding volumes, either because the event queue so reported or because the objects' motion violated some assumption by which the temporal bounding volumes were created, into the spatial data structure instead of the respective temporal bounding volumes, (b) output-sensitively processing the spatial data structure so as to render its visible parts and so as to replace visible temporal bounding volumes by their respective dynamic objects, (c) creating temporal bounding volumes for the hidden dynamic objects which do not already have temporal bounding volumes, inserting said temporal bounding volumes into the spatial database instead of the hidden dynamic objects and inserting into the event queue the times at which the temporal bounding volume will no longer be assured to contain their respective dynamic objects, and (d) repeating steps (a) to (c) for each image to be rendered.

27. In a process for rendering a 3-dimensional graphics scene comprising a plurality of static and/or dynamic objects composed of geometrical elements, a method for obviating redundant processing of hidden dynamic objects in successive images of said scene so as thereby to accelerate the rendering of successive images of said scene; the method including in respect of each hidden dynamic object:

(a) predicting a time period $\Delta t$ during which said hidden dynamic object is assumed to remain hidden; and (b) during said time period $\Delta t$, not rendering said hidden dynamic object so as to output-sensitively process the scene.

* * * * *